(12) United States Patent
Yasaki

(10) Patent No.: US 6,618,427 B1
(45) Date of Patent: Sep. 9, 2003

(54) SPREAD SPECTRUM COMMUNICATION SYSTEM AND BASE STATION THEREOF

(75) Inventor: Takahiro Yasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/317,136

(22) Filed: May 24, 1999

(30) Foreign Application Priority Data

May 27, 1998 (JP) .......................... 10-145898

(51) Int. Cl.[7] .............................. H04B 15/00; H04B 1/69
(52) U.S. Cl. .................. 375/130; 370/252; 370/329
(58) Field of Search ................................. 370/252, 335, 370/329, 441, 503; 375/130, 346, 355; 455/63, 69, 509, 522, 452

(56) References Cited

U.S. PATENT DOCUMENTS

| | | | | |
|---|---|---|---|---|
| 5,873,028 A | * | 2/1999 | Nakano et al. | 455/69 |
| 5,987,055 A | * | 11/1999 | Duque-Anton et al. | 375/130 |
| 5,991,329 A | * | 11/1999 | Lomp et al. | 375/130 |
| 6,005,852 A | * | 12/1999 | Kokko et al. | 370/329 |
| 6,088,335 A | * | 7/2000 | I et al. | 370/252 |

FOREIGN PATENT DOCUMENTS

| | | |
|---|---|---|
| GB | 2 304 495 | 3/1997 |
| JP | 5-102943 | 4/1993 |
| JP | 08065738 A | 3/1995 |
| JP | 08032514 A | 2/1996 |
| JP | 09148981 A | 6/1997 |
| JP | 09284212 A | 10/1997 |
| WO | WO 94/06217 | 3/1994 |
| WO | WO 95/19664 | 7/1995 |
| WO | WO 9535637 | * 12/1995 |
| WO | WO 96/31013 | 10/1996 |
| WO | WO 98/09465 | 3/1998 |

* cited by examiner

*Primary Examiner*—Stephen Chin
*Assistant Examiner*—Edith Yeh
(74) *Attorney, Agent, or Firm*—Witham, Curtis & Christofferson, P.C.

(57) ABSTRACT

A spread spectrum communication system includes a plurality of cells which share common frequencies. Each base station managing each cell includes transmitters for transmitting a reception load state of the base station to other base stations managing other cells. Receivers for receiving reception load states of the other base stations and transmitters for transmitting a signal having control information interpolated therein to each mobile station within the cell under management are included in the system. The control information is used for controlling a transmission station of each mobile station. A second receiver for receiving a signal from each mobile station within the cell under management and a power control are included for determining the control information for each mobile station so as not to interfere with operations of the other base stations managing the other cells with reference to a reception level index of the signal from each mobile station and the reception load states of the other base stations managing the other cells.

26 Claims, 6 Drawing Sheets

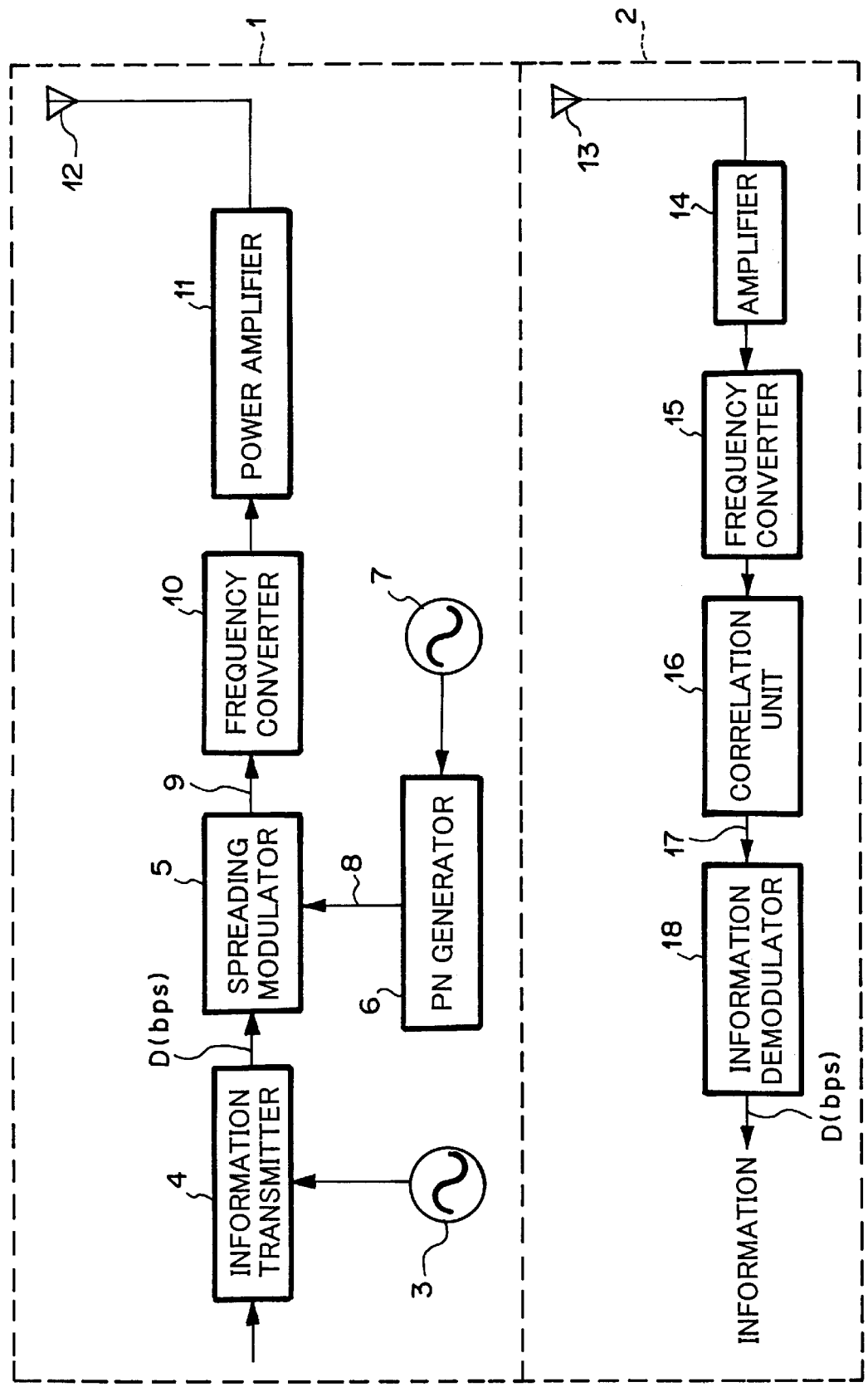

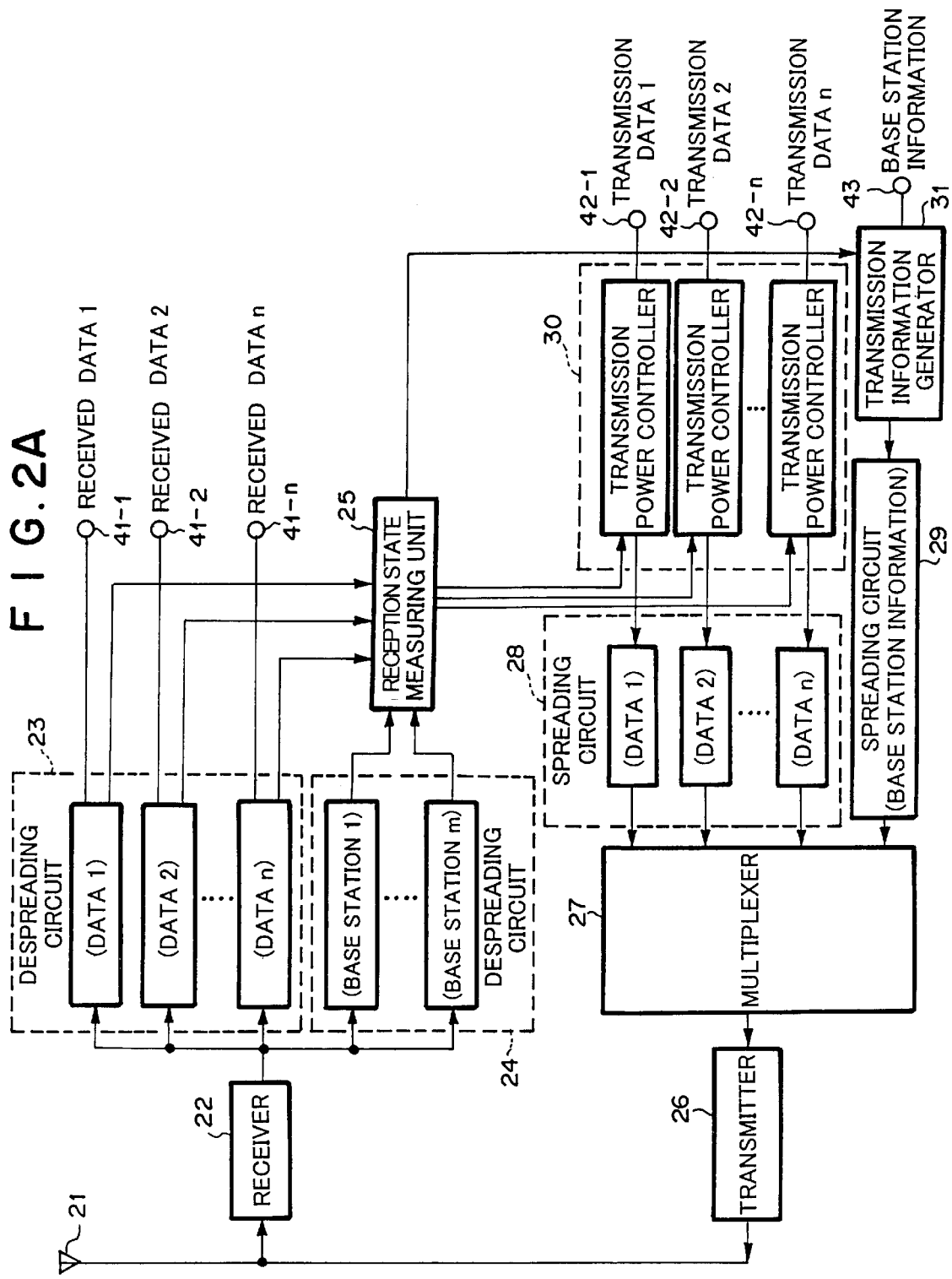

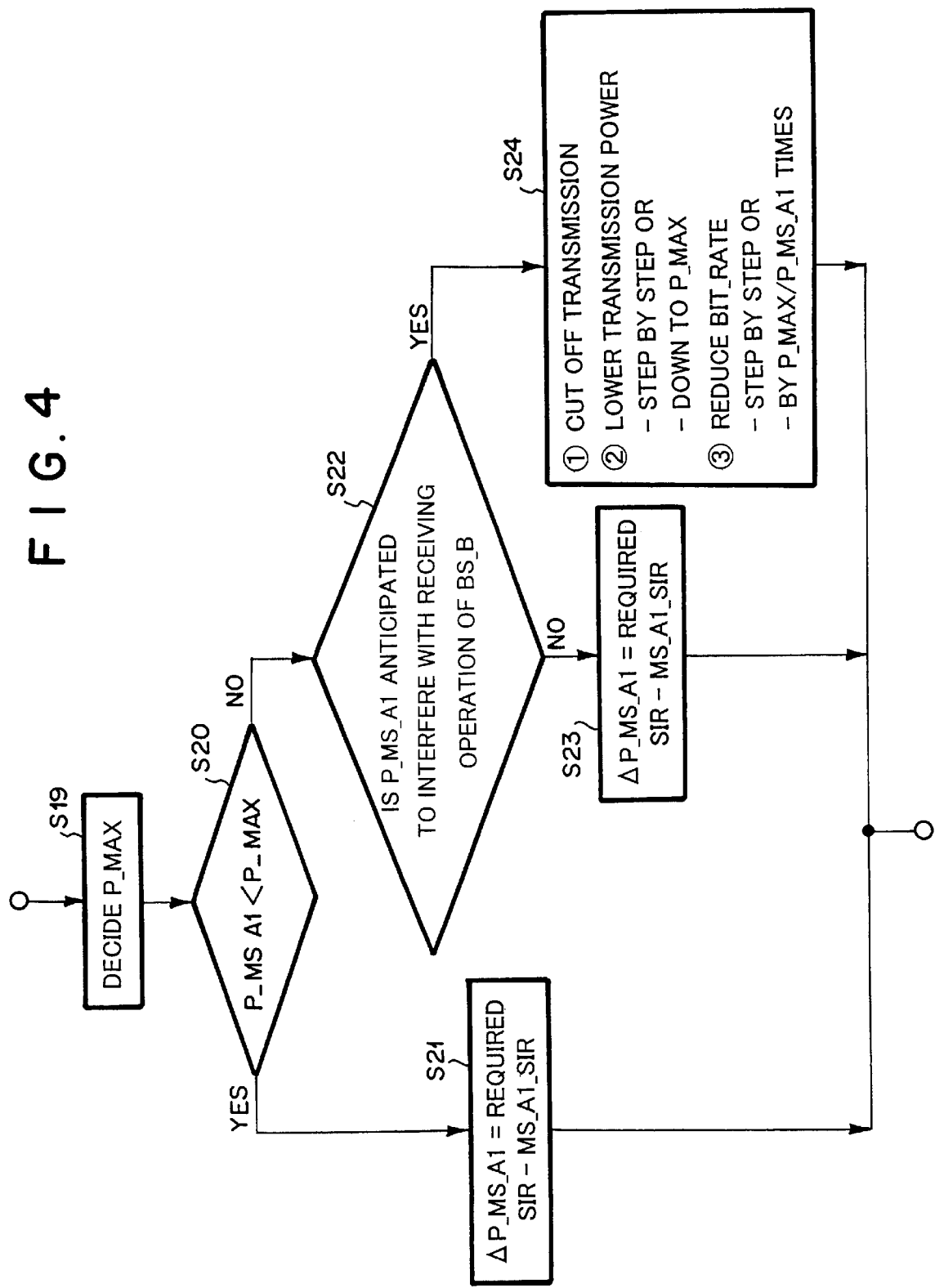

SPREAD SPECTRUM COMMUNICATION SYSTEM AND BASE STATION THEREOF

BACKGROUND OF THE INVENTION

1. Field of the Invention

The present invention relates to a spread spectrum communication system divided into a plurality of cells, such as a CDMA (Code Division Multiple Access) system.

2. Description of the Prior Art

A conventional example of a power controller for use in the spread spectrum CDMA radio communication system varies a process gain in accordance with a location in a cell where a mobile station exists as disclosed in JPA 9-284212.

Process gain PG is derived from spread rate C (chip/sec)= 1/Tc which is the reciprocal of 1 chip time Tc of Pseudo Noise series and data transmission rate D (bps), and is represented as PG=C/D=TcD (chip/bit). Increasing spread rate C of direct spread reduces a power spectral density and expands a spread bandwidth. If data transmission rate D is constant, process gain PG increases characteristically when spread rate C increases.

Therefore, if spread rate C is increased while sustaining a constant transmission rate of a mobile station that is located close to a certain base station relative to a mobile station that is located remotely, the process gain for the closely located mobile station increases and the power spectral density of the signal received at the base station from the closely located mobile station decreases so that the power spectral densities received at the base station from the respective mobile stations become substantially equal level.

On the other hand, if the data transmission rate is decreased while sustaining a constant chip rate of the mobile station that is located remotely from the base station relative to the mobile station that is located closely, the process gain increases and an S/N ratio (Signal-to-Noise Ratio) increases.

Thus, such distance problem existing among the mobile stations located close to the station and those located remotely from the base station can be solved, and in addition, interference to other stations can be suppressed.

FIG. 1 is a block diagram showing an arrangement of the above spread spectrum communication system. FIG. 1 shows a transmitter/receiver section, which includes SS (Spread Spectrum) transmitter 1 and SS receiver 2, provided in a base station and each mobile station. In SS transmitter 1, a signal containing audio data, information data and image data is primarily modulated by a data clock supplied from data clock generator 3 at information transmitter 4 so as to be another signal having a predetermined data transmission rate D. Thus generated signal is fed to next spreading modulator 5.

PN clock is fed to PN generator 6 from PN clock generator 7. PN generator 6 generates PN signal 8 with a predetermined spread rate C accordingly. The PN signal is fed to spreading modulator 5.

The signal from information transmitter 4 is directly spread by PN signal 8 at spreading modulator 5. The directly spread signal (hereinafter, referred to as an SS signal) 9 is converted into the SS signal having a radio frequency by frequency converter 10, then amplified by power amplifier 11, and transmitted from antenna 12.

On the other hand, in SS receiver 2, the SS signal received at antenna 13 is amplified by amplifier 14, and then is converted into the SS signal having an intermediate frequency or baseband frequency. It is subsequently synchronized correlatively at correlation unit 16, and then demodulated into the original signal by information demodulator 18.

In the above configuration, data transmission rate D is controlled by varying a clock speed of data clock generator 3, and spread rate C is controlled by varying a clock speed of PN clock generator 7. Thus, the process gain can be controlled by controlling these clock speeds.

The above prior art, however, includes a disadvantage that increasing spread rate C of the closer mobile station widen a frequency bandwidth and reduces frequency usage efficiency. There is also a disadvantage that a circuit scale of controller for increasing spread rate C becomes large, and especially it becomes troublesome for the mobile station.

SUMMARY OF THE INVENTION

In order to overcome the aforementioned disadvantages, the present invention has been made and accordingly, has an object to provide a spread spectrum communication system divided into a plurality of cells (for example, the CDMA (Code Division Multiple Access) system) in which communications in one cell does not communications in adjacent cells.

According to an aspect of the present invention, there is provided a spread spectrum communication system comprising a plurality of cells which share common frequencies, wherein each base station managing each cell comprises: a first transmitting means for transmitting a reception load state of the own base station to other base stations managing other cells; a first receiving means for receiving reception load states of the other base stations from the other base stations managing the other cells; a second transmitting means for transmitting a signal having control information interpolated therein to each mobile station within the cell under management of the own base station, the control information being used for controlling a transmission state of the each mobile station; a second receiving means for receiving a signal from the each mobile station within the cell under management of own base station; and a power control means for determining the control information for the each mobile station so as not to interfere with operations of the other base stations managing the other cells with reference to a reception level index of the signal from the each mobile station and the reception load states of the other base stations managing the other cells.

In the spread spectrum communication system, the control information may be set to special information for lowering or cutting off a transmission power of the each mobile station if it is estimated that the transmission power of the each mobile station for gaining a desired value of the reception level index of the signal from the each mobile station interferes with the operations of the other base stations managing the other cells.

In the spread spectrum communication system, the estimation of interference may be executed with reference to the reception load states of the other base stations managing the other cells.

In the spread spectrum communication system, the estimation of interference may be executed in consideration of a relative relationship between a location of the each mobile station and locations of the other base stations managing the other cells, the location of the each mobile station being computed on the basis of the control information and the signal from each mobile station.

In the spread spectrum communication system, the special information may comprise such information as halts a transmission operation of the mobile station.

In the spread spectrum communication system, the special information may comprise such information as lowers the transmission power of the mobile station.

In the spread spectrum communication system, the special information may comprise such information as decreases a transmission rate of the mobile station.

In the spread spectrum communication system, contents of the control information sent to the each mobile station may be decided so as to gain a desired value of the reception level index of the signal from each mobile station if it is not estimated that the transmission power of the each mobile station for gaining the desired value of the reception level index of the signal from the each mobile station interferes with the operations of the the other base stations managing the other cells.

In the spread spectrum communication system, contents of the control information sent to the each mobile station may be decided so as to gain a desired value of the reception level index of the signal from each mobile station if a transmission power of the each mobile station for gaining the desired value of the reception level index of the signal from the each mobile station is less than a certain upper limit value.

In the spread spectrum communication system, the certain upper limit value may be determined in accordance with distances of the other base stations managing the other cells from the own base station.

In the spread spectrum communication system, the first transmitting means may transmit the reception load state of the own base station during the first receiving means is not receiving the reception load states from the other base stations managing the other cells.

In the spread spectrum communication system, the first transmitting means may transmit the reception load state of the own base station in time-division together with the first receiving means of the other base stations managing the other cells.

In the spread spectrum communication system, the power control means may determine the control information of the each mobile station dependently on every area formed by dividing the cell under management of the own base station.

Other features and advantages of the invention will be apparent from the following description of the preferred embodiments thereof.

BRIEF DESCRIPTION OF THE DRAWINGS

The present invention will be more fully understood from the following detailed explanation with reference to the accompanying drawings in which:

FIG. 1 a block diagram showing a configuration of a transmitter and receiver at a base station and a mobile station in a conventional spread spectrum communication system;

FIG. 2A is a block diagram showing a configuration of a base station managing each cell in a spread spectrum communication system according to an embodiment of the present invention;

FIG. 4 is a flowchart explaining operations of a reception state measuring unit 25 of FIG. 2A.

DETAILED DESCRIPTION OF THE PREFERRED EMBODIMENTS

Embodiments of the present invention will be explained in detail with reference to the drawings.

Embodiment 1

Figure 2B:
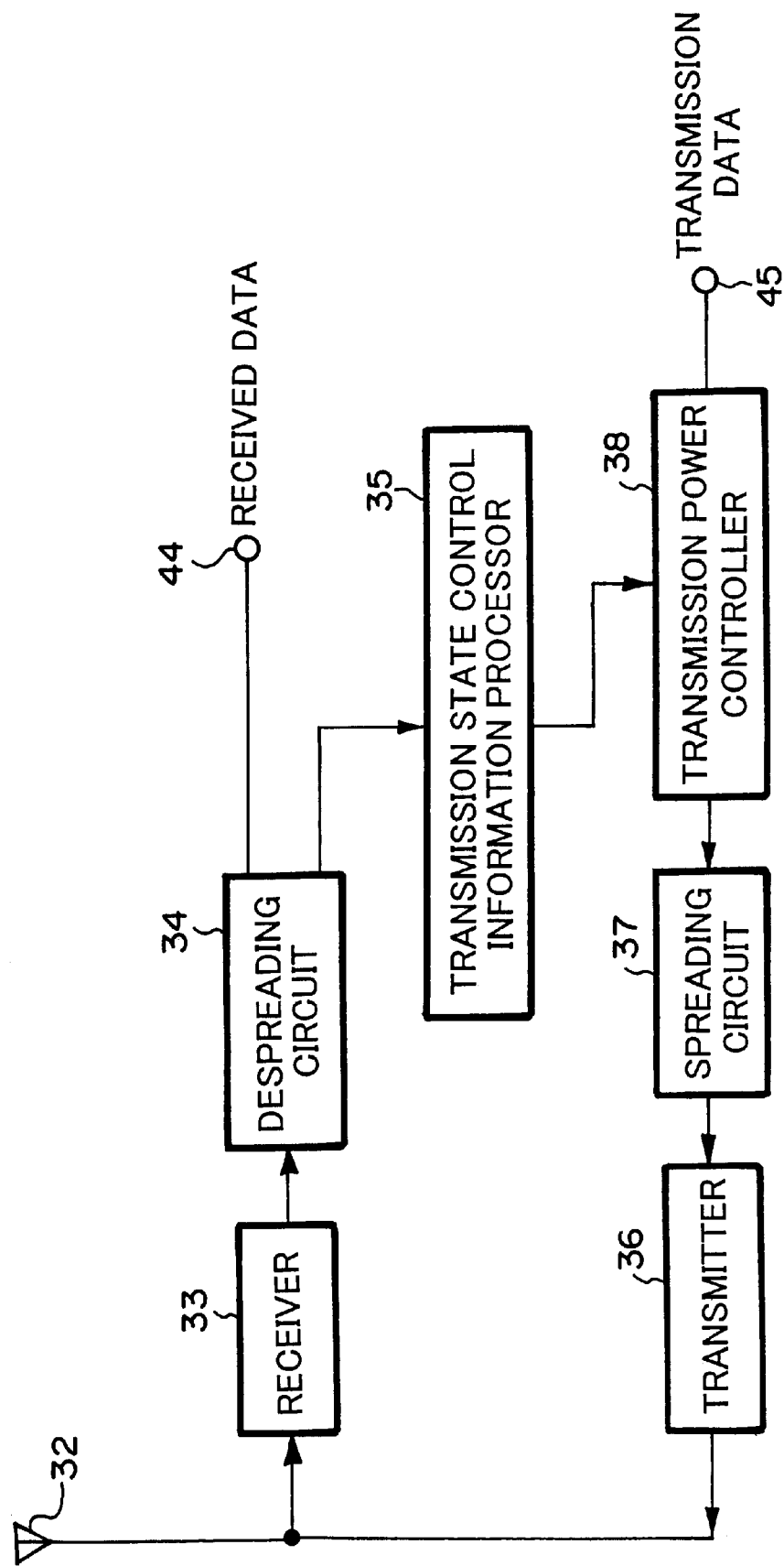
FIG. 2B is a block diagram showing a configuration of a mobile station in the spread spectrum communication system according to the embodiment of the present invention.

Each cell in a spread spectrum communication system according to an embodiment of the present invention includes a base station shown in FIG. 2A and mobile stations shown in FIG. 2B.

Referring to FIG. 2A, antenna 21, which serves as both a transmitting antenna and receiving antenna, transmits and receives a radio wave.

In the receiver side, an electric signal changed from the radio wave which is received at antenna 21 is amplified and frequency-converted into a baseband signal by receiver 22, and then supplied to despreading circuits 23 prepared for respective mobile stations and despreading circuits 24 for other base station channels. Despreading circuit 23 despreads an input signal by a spread code to obtain received data 41-i (i=1, 2, ..., n) for each channel by multiplying the input signal by the same spread code as that in the transmitting side. Despreading circuit 24 also performs despreading similarly. The data after despread at despreading circuit 24 comprises base station information which is obtained from other base station. The base station information includes various information such as information relating to the received load state of other base station (information relating to a desired received signal power versus interference wave power ratio SIR (Signal-to-Interference Ratio) of the signal received from individual mobile stations, and whether the number of mobile stations in the cell is within a range capable of obtaining a certain SIR, for example). They also include information relating to the transmission power of the base station. Reception state measuring unit 25 controls the transmission power of each mobile station based on the power values of the received data and the received states of other base stations.

In the transmitter side, transmission data 42-i (i=1, 2, ..., n) for each channel is added with transmission state control information at transmission power controller 30 and is sent to spreading circuit 28. Base station information 43 is added at any time, at transmission information generator 31, with the reception load state which is obtained by reception state measuring unit 25, and is sent to spreading circuit 29. The data spread by each of spreading circuits 28 and 29 is synthesized by multiplexer 27 and is converted into a radio frequency at transmitter 26. It is then transmitted from antenna 21 as a radio wave.

Referring to FIG. 2B, in the mobile station, antenna 32 serves as both a transmitting antenna and receiving antenna similarly to the base station. An electric signal changed from a radio wave that is received at antenna 32 is frequency-converted into a baseband signal by receiver 33 and supplied to despreading circuit 34. Despreading circuit 34 performs despreading to obtain a received data by multiplying the frequency-converted baseband signal by the same spread code as was used at the time of spreading. The transmission state control information contained in the received data is extracted to determine the transmission power of the mobile station by transmission state control information processor 35. In the transmitter at the mobile station, transmission power controller 38 determines the transmission power of a transmission data based on information obtained from transmission state control information processor 35, and thereafter spreading circuit 37 performs spreading of the transmission data. After converted into a radio wave frequency at transmitter 36, the transmission data is transmitted from antenna 32 as a radio wave.

Operations of the embodiment of the present invention will be explained next with reference to the drawings.

Figure 3A:
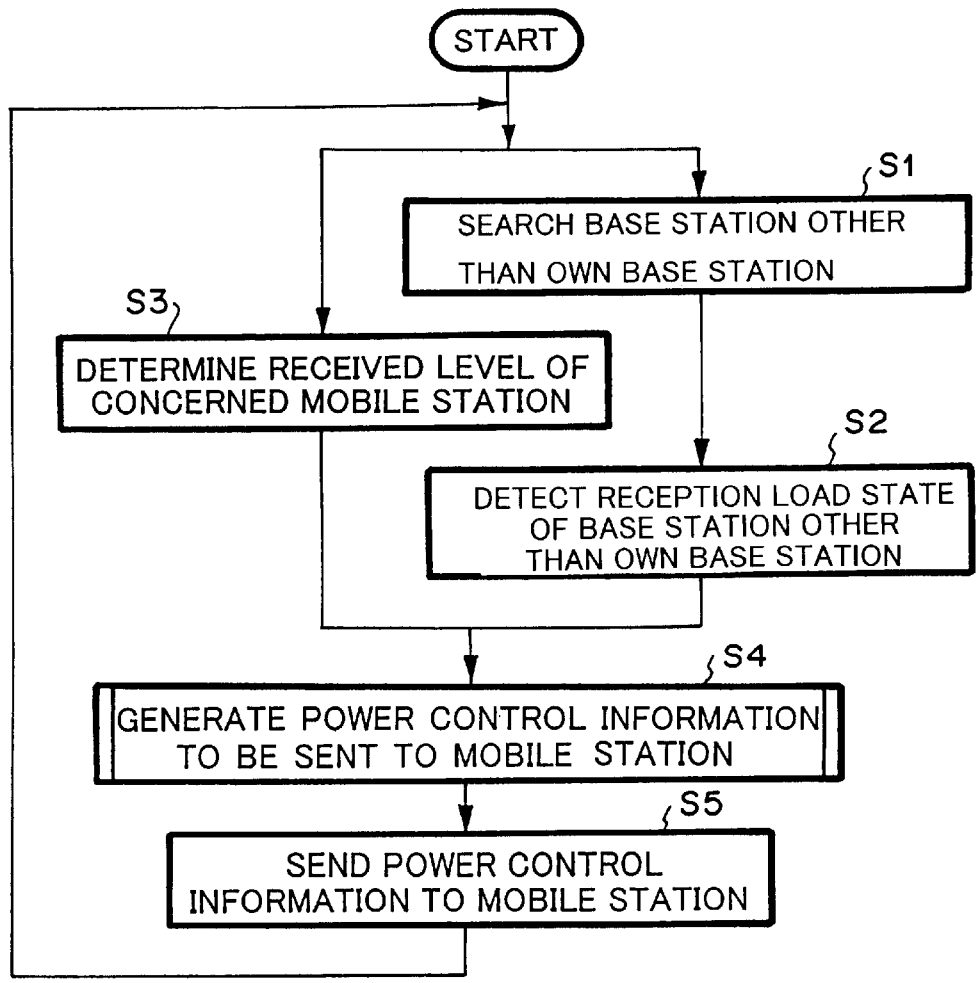
FIG. 3A is a flowchart explaining operations of the base station shown in FIG. 2A.
Figure 3B:
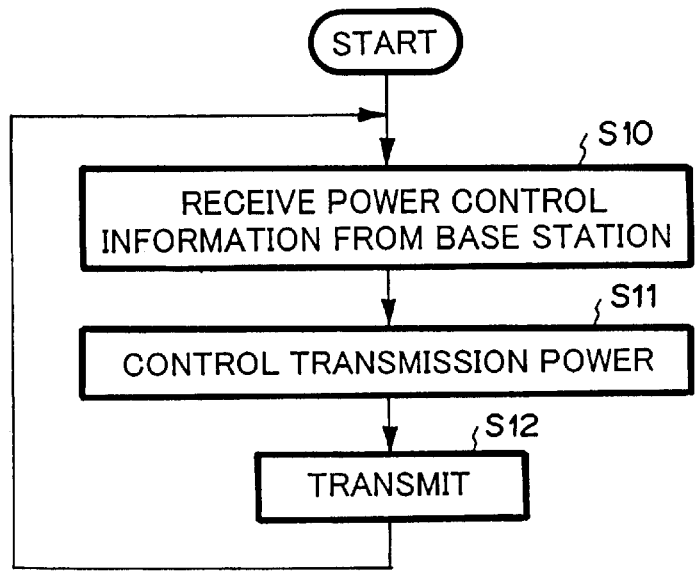
FIG. 3B is a flowchart explaining operations of the mobile station shown in FIG. 2B.
Figure 5:
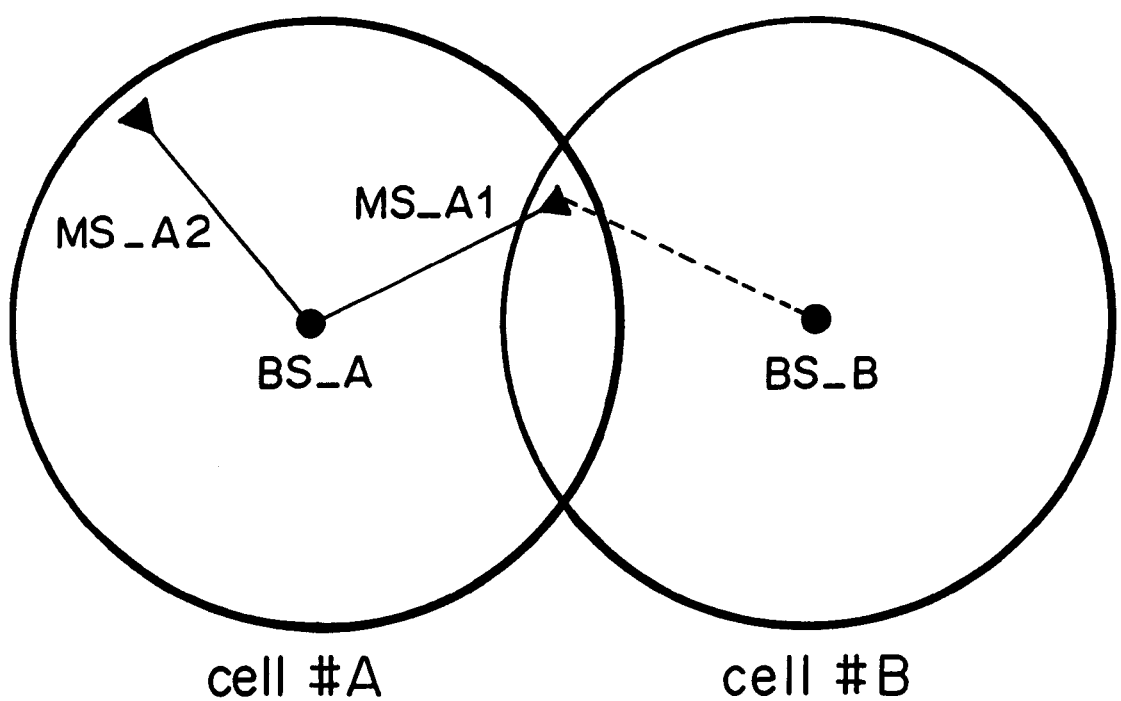
FIG. 5 is an arrangement example of a cell, a base station and mobile stations in the spread spectrum communication system according to the embodiment of the present invention.

An outline of the operations will be explained first with reference to a flowchart of FIGS. 3A, 3B. FIG. 3A is a flowchart showing operation of the base station and FIG. 3B the mobile station. For simplifying explanation, only two cells, cell #A and cell #B, are present as shown in FIG. 5. Cell #A includes base station BS_A and cell #B includes base station BS_B. Base station BS_A is called as the concerned base station and base station BS_B is called as another base station. Mobile stations MS_A1 and MS_A2 belong to base station BS_A. Mobile station MS_A2 is located apart from base station BS_B while mobile station MS_A1 is located close to base station BS_B.

Cell #A and cell #B utilize a common frequency in FIG. 5 while communications between the base station and mobile stations are performed individually.

In the receiver side of base station BS_A (S1), the following operation is executed. First, a signal from base station BS_B is searched by use of despreading circuit 24. Each of base stations is identified with respective different spread code. However, it was difficult to receive signals from other stations using the common frequency because a pilot channel for transmitting a reference signal and a common control channel are always used for transmission in the prior art. This is solved in this embodiment by performing intermittent transmissions on these channels or by performing time-divisional transmissions together with other base stations. In the intermittent transmission, transmission to other base stations is preformed when signals from other stations are not received. In the time-divisional transmission, assigning an orthogonal code that has an identical length and exhibits a different value to each base station, respectively. This enables to receive the signals from other stations with the common frequency by transmitting when the value of the code is "0" and receiving when it is not "0". Each base station establishes a channel for broadcasting it's station information to other base stations during a non-receiving duration between the searches, and transmits base station information including it's base station ID and reception load state constructed by transmission information generator 31. The spread base station information data of base station BS_B which has been searched at step S1 is demodulated at step S2 by using despreading circuit 24 for despreading it.

SS signal received from each of mobile stations MS_A1 and MS_A2 which belong to base station BS_A in cell #A is demodulated by use of despreading circuit 23, and a reception level index of the SS signal, which is sent from each of mobile stations MS_A1 and MS_A2 and received at base station BS_A, is measured at step S3 simultaneously with steps S1 and S2. Because the desired received signal power versus interference wave power ratio, SIR (Signal-to-Interference Ratio), can be detected for every mobile station, it is appropriate to used SIR as the reception level index.

Reception state measuring unit 25 computes the transmission power of each mobile station at step S4 based on the reception load state of base station BS_B obtained at step S2 and reception level index of each mobile station obtained at step S3 so as to reduce the affection to base station BS_B as well as to maintain stable communicate with mobile stations MS_A1 and MS_A2 belonging to base station BS_A. It also generates the transmission state control information containing information related to the transmission power. This method will be explained in more detail later.

Transmission power controller 30 interpolates the transmission state control information computed at step S4 into a down stream signal, which is transmitted to each mobile station from antenna 21 through multiplexer 27 and transmitter 26 (S5).

In mobile stations MS_A1 and MS_A2, antenna 32 converts the radio wave from base station BS_A into an electric signal and outputs it. Receiver 33 amplifies, frequency-converts this signal and outputs it. Despreading circuit 34 receives this signal and obtains the transmission state control information contained in the down stream signal by despreading (S10). Despreading circuit 34 obtains received data 44 simultaneously and outputs it to a data processor not depicted. At step S11, transmission power controller 38 determines a power of the up stream signal including transmission data to base station BS_A by use of the transmission state control information processed at transmission state control information processor 35. At step S12, the output of transmission power controller 38 becomes the SS signal by spreading at spreading circuit 37, then is frequency-converted and amplified in transmitter 36, and the output of transmitter 36 is transmitted from antenna 32.

A power control method for each of mobile stations MS_A1 and MS_A2 performed in reception state measuring unit 25 of base station BS_A will be explained in detail next with reference to a flowchart of FIG. 4. Each of base stations BS_A and BS_B transmits the base station information at an identical transmission power. Therefore, the distance between base station BS_A and station BS_B can be measured on the basis of the power attenuation of a signal received from base station BS_B in the adjacent cell by base station BS_A. If each base station synchronizes with each other, the distance can be also measured on the basis of a time delay. Base station BS_A decides the maximum control transmission power P_MAX for each mobile station, which does not give an affection that exceeds a certain degree to the system of base station BS_B, in consideration of the distance between base stations BA_A and BS_B (S19).

At step S20, an SIR of a signal from a mobile station (for example, MS_A1) is measured. Then, transmission power P_MS_A1 of mobile station MS_A1 which ensures the SIR of the signal received from mobile station MS_A1 be a desired value based on the measured SIR. Thereafter, it is determined whether transmission power P_MS_A1 is lower than the maximum control transmission power P_MAX. If the determined result is Yes, then the flow goes to step S21. If the determined result is No, then the flow goes to step S22. At step S21, difference ΔP_MS_A1 of the transmission power of mobile station MS_A1 is determined so that MS_A1_SIR, which is the present SIR of the signal received from mobile station MS_A1, becomes a required SIR. Difference ΔP_MS_A1 is represented by:

ΔP_MS_A1=the required SIR−MS_A1_SIR

If a transmission power higher than P_MAX is required because mobile station MS_A1 is located far apart from base station BS_A, the following control is performed.

At step S22, it is determined whether transmission power P_MS_A1 of mobile station MS_A1 affects the operation of base station BS_B. If the determined result is Yes, then the flow goes to step S24. If the determined result is No, then the flow goes to step S23. At step S23, difference ΔP_MS_A1 of the transmission power of mobile station MS_A1 is determined so that MS_A1_SIR, which is the present SIR of the signal received from mobile station MS_A1, becomes a required SIR similarly to step S21.

The reception load state of base station BS_B is considered in the determination at step S22. In addition, the distance between mobile station MS_A1 and base station BS_B is considered. The distance therebetween is determined by both the location (specified by an orientation and distance) of mobile station, which is calculated on the basis of the transmission power of mobile station MS_A1 instructed by base station BS_A and a level and incoming direction of the signal received from mobile station MS_A1, and the location of base station BS_B, which is calculated similarly. If there is little margin in the reception load state of base station BS_B, the result of determination at step S22 becomes Yes because mobile station MS_A1 is located close to base station BS_B. If there is some or more margin in the reception load state of base station BS_B, the result of determination at step S22 becomes No though mobile station MS_A1 is located close to base station BS_B. Because mobile station MS_A2 is located far apart from base station BS_B as compared with mobile station MS_A1, even if the distance between mobile station MS_A1 and base station BS_A1 and the distance between mobile station MS_A2 and base station BS_A1 are the same and the transmission power necessary to obtain a required SIR are the same for both of them, the threshold level of the reception load state of base station BS_B, at which the determined result at step S22 changes, is not the same for base station BS_A1 and base station BS_A2. That is, the threshold level of the reception load state for base station BS_A2 is located at a less margin position than that for base station BS_A1.

The following operations are executed at step S24:

(a) cutting off the transmission operation of mobile station MS_A1;

(b) lowering the transmission power of mobile station MS_A1; and (c) reducing the transmission data rate of mobile station MS_A1. The transmission power of mobile station MS_A1 may be gradually lowered with a certain step or may be instantaneously lowered to power P_MAX that has been determined so as not to affect station BS_B. Similarly, the bit rate may be gradually reduced with a certain step or may be instantaneously multiplied with P_MAX/P_MS_A1. These three methods (a), (b) and (c) may be used independently, in combination, or selectively in accordance with progress of control.

In a case where base station BS_A is surrounded by a plurality of other base stations, the process shown in FIG. 4 is performed in consideration of each of all other base stations and the results thereof are used to determine the final transmission power of the mobile station. The final transmission power of the mobile station may be, for example, the minimum among the transmission powers each determined in consideration of each of all other base stations.

Embodiment 2

A second embodiment of the present invention will be explained with reference to the drawings.

Referring to FIG. 5, a cell covered by a system of each base station has a form of circle in the first embodiment. In the second embodiment, a directivity of antenna 21 at base station BS_A of FIG. 2 is divided so as to provide plural directivities in a form of a multi-beam antenna so as to cover the cell with plural systems. Thus, dividing the cell of one base station into plural areas increases a capacity per area and, because of the directivity of antenna, reduces interference from other cells. Therefore, there is provided a system in which influence from the mobile stations to other base stations is reduced.

Though SIR is used as the index of the reception level at the mobile station in the above embodiment, an error rate of data transmission or RSSI (Receive Signal Strength Indicator) may also be used as the index. Combination of SIR, the error rate, and RSSI may be used as the index.

Although the present invention has been shown and explained with respect to the preferred mode embodiments thereof, it should be understood by those skilled in the art that the forgoing and various other changes, omissions, and additions in the form and detail thereof may be made therein without departing from the spirit and scope of the present invention.

What is claimed is:

1. A spread spectrum communication system comprising a plurality of cells which share common frequencies, wherein each base station managing each cell comprises:

a first transmitting means for transmitting a reception load state of the own base station to other base stations managing other cells;

a first receiving means for receiving reception load states of said other base stations from said other base stations managing said other cells;

a second transmitting means for transmitting a signal having control information interpolated therein to each mobile station within the cell under management of said own base station, said control information being used for controlling a transmission state of said each mobile station;

a second receiving means for receiving a signal from said each mobile station within said cell under management of own base station; and a power control means for determining said control information for said each mobile station so as not to interfere with operations of said other base stations managing said other cells with reference to a reception level index of the signal from said each mobile station and said reception load states of said other base stations managing said other cells.

2. The spread spectrum communication system according to claim 1, wherein said control information is set to special information for lowering or cutting off a transmission power of said each mobile station if it is estimated that said transmission power of said each mobile station for gaining a desired value of said reception level index of said signal from said each mobile station interferes with the operations of said other base stations managing said other cells.

3. The spread spectrum communication system according to claim 2, wherein an estimation of interference is executed with reference to said reception load states of said other base stations managing said other cells.

4. The spread spectrum communication system according to claim 3, wherein said estimation of interference is executed in consideration of a relative relationship between a location of said each mobile station and locations of said other base stations managing said other cells, said location of said each mobile station being computed on the basis of said control information and the signal from each mobile station.

5. The spread spectrum communication system according to claim 2, wherein said special information comprises such information as halts a transmission operation of said mobile station.

6. The spread spectrum communication system according to claim 2, wherein said special information comprises such information as lowers said transmission power of said mobile station.

7. The spread spectrum communication system according to claim 2, wherein said special information comprises such information as decreases a transmission rate of said mobile station.

8. The spread spectrum communication system according to claim 2, wherein contents of said control information sent to said each mobile station are decided so as to gain a desired value of said reception level index of said signal from each mobile station if it is not estimated that said transmission power of said each mobile station for gaining said desired value of said reception level index of said signal from said each mobile station interferes with the operations of said said other base stations managing said other cells.

9. The spread spectrum communication system according to claim 1, wherein contents of said control information sent to said each mobile station are decided so as to gain a desired value of said reception level index of said signal from each mobile station if a transmission power of said each mobile station for gaining said desired value of said reception level index of said signal from said each mobile station is less than a certain upper limit value.

10. The spread spectrum communication system according to claim 9, wherein said certain upper limit value is determined in accordance with distances of said other base stations managing said other cells from said own base station.

11. The spread spectrum communication system according to claim 1, wherein said first transmitting means transmits said reception load state of said own base station during said first receiving means is not receiving said reception load states from said other base stations managing said other cells.

12. The spread spectrum communication system according to claim 1, wherein said first transmitting means transmits said reception load state of said own base station in time-division together with said first receiving means of said other base stations managing said other cells.

13. The spread spectrum communication system according to claim 1, wherein said power control means determines said control information of said each mobile station dependently on every area formed by dividing said cell under management of said own base station.

14. A base station for managing a cell in a spread spectrum communication system comprising a plurality of cells which share common frequencies, which base station comprising:
 a first transmitting means for transmitting a reception load state of the own base station to other base stations managing other cells;
 a first receiving means for receiving reception load states of said other base stations from said other base stations managing said other cells;
 a second transmitting means for transmitting a signal having control information interpolated therein to each mobile station within the cell under management of said own base station, said control information.being used for controlling a transmission state of said each mobile station;
 a second receiving means for receiving a signal from said each mobile station within said cell under management of own base station; and
 a power control means for determining said control information for said each mobile station so as not to interfere with operations of said other base stations managing said other cells with reference to a reception level index of the signal from said each mobile station and said reception load states of said other base stations managing said other cells.

15. The base station according to claim 14, wherein said control information is set to special information for lowering or cutting off a transmission power of said each mobile station if it is estimated that said transmission power of said each mobile station for gaining a desired value of said reception level index of said signal from said each mobile station interferes with the operations of said other base stations managing said other cells.

16. The base station according to claim 15, wherein an estimation of interference is executed with reference to said reception load states of said other base stations managing said other cells.

17. The base station according to claim 16, wherein said estimation of interference is executed in consideration of a relative relationship between a location of said each mobile station and locations of said other base stations managing said other cells, said location of said each mobile station being computed on the basis of said control information and the signal from each mobile station.

18. The base station according to claim 15, wherein said special information comprises such information as halts a transmission operation of said mobile station.

19. The base station according to claim 15, wherein said special information comprises such information as lowers said transmission power of said mobile station.

20. The base station according to claim 15, wherein said special information comprises such information as decreases a transmission rate of said mobile station.

21. The base station according to claim 15, wherein contents of said control information sent to said each mobile station are decided so as to gain a desired value of said reception level index of said signal from each mobile station if it is not estimated that said transmission power of said each mobile station for gaining said desired value of said reception level index of said signal from said each mobile station interferes with the operations of said said other base stations managing said other cells.

22. The base station according to claim 14, wherein contents of said control information sent to said each mobile station are decided so as to gain a desired value of said reception level index of said signal from each mobile station if a transmission power of said each mobile station for gaining said desired value of said reception level index of said signal from said each mobile station is less than a certain upper limit value.

23. The base station according to claim 22, wherein said certain upper limit value is determined in accordance with distances of said other base stations managing said other cells from said own base station.

24. The base station according to claim 14, wherein said first transmitting means transmits said reception load state of said own base station during said first receiving means is not receiving said reception load states from said other base stations managing said other cells.

25. The base station according to claim 14, wherein said first transmitting means transmits said reception load state of said own base station in time-division together with said first receiving means of said other base stations managing said other cells.

26. The base station according to claim 14, wherein said power control means determines said control information of said each mobile station dependently on every area formed by dividing said cell under management of said own base station.

* * * * *